US012769734B2

(12) United States Patent
Chioccola et al.

(10) Patent No.: US 12,769,734 B2
(45) Date of Patent: Oct. 20, 2026

(54) METHOD AND SYSTEM FOR AUTOMATING HISTORICAL DATA ANALYTICS

(71) Applicant: JPMorgan Chase Bank, N.A., New York, NY (US)

(72) Inventors: Francesco Chioccola, Colchester (GB); Naina Rowan, London (GB); Frederik Giertz, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/819,367

(22) Filed: Aug. 29, 2024

(65) Prior Publication Data

US 2026/0064681 A1 Mar. 5, 2026

(51) Int. Cl.
*G06F 16/2453* (2019.01)
*G06F 16/248* (2019.01)

(52) U.S. Cl.
CPC ...... *G06F 16/24539* (2019.01); *G06F 16/248* (2019.01)

(58) Field of Classification Search
None
See application file for complete search history.

(56) References Cited

U.S. PATENT DOCUMENTS

2007/0005477 A1* 1/2007 McAtamney .......... G06Q 40/00 705/35
2009/0172518 A1* 7/2009 Ogievetsky ........... G06F 16/972 715/764
2017/0041296 A1* 2/2017 Ford ........................ G06F 21/64
2021/0256019 A1* 8/2021 Prophete ............... G06F 40/205
2021/0319349 A1* 10/2021 Srivastava .......... G06F 16/9574
2022/0318236 A1* 10/2022 Smith ................... G06F 16/248
2025/0103632 A1* 3/2025 Baxter .................. G06F 40/279
2025/0259247 A1* 8/2025 Karbowiak ............ G06Q 40/12

* cited by examiner

*Primary Examiner* — Dawaune A Conyers
(74) *Attorney, Agent, or Firm* — GREENBLUM & BERNSTEIN, P.L.C.

(57) ABSTRACT

A method for facilitating automated analysis of historical data is disclosed. The method includes generating a graphical user interface for a user, the graphical user interface including an interactive dashboard that is configured to receive input from the user; receiving, via the graphical user interface, queries from the user, the queries including parameters and date ranges; determining whether a report that corresponds to each of the queries is cached in a data repository; identifying, by using a model, data sets that correspond to the parameters and the date ranges when the report is not cached; generating, by using the model, a new report based on the identified data sets, the one new report corresponding to the queries; and displaying, via the graphical user interface, the new report for the user.

20 Claims, 5 Drawing Sheets

100

METHOD AND SYSTEM FOR AUTOMATING HISTORICAL DATA ANALYTICS

BACKGROUND

1. Field of the Disclosure

This technology generally relates to methods and systems for automating data analytics, and more particularly to methods and systems for providing an interactive user interface and data framework to facilitate automated analysis of historical data across regimes.

2. Background Information

Many business entities maintain large collections of historical data to facilitate business operations. Often, the historical data may be usable to provide valuable insight for decision makers. Historically, implementations of conventional data analytic techniques have resulted in varying degrees of success with respect to effective and efficient identification of levels of significance in these large collections of historical data.

One drawback of implementing the conventional data analytic techniques is that in many instances, the collections of historical data contain large volumes of data with various quality values. As a result, acquiring long-term levels of significance in the historical data requires large investments in resources in return for inconsistent outputs. Additionally, due to the poor accuracy and inconsistent quality of values, assessments of similarities between current and historical regimes may not be usable to effectively determine future potential conditions.

Therefore, there is a need for an interactive user interface and data framework to facilitate automated analysis of historical data across regimes.

SUMMARY

The present disclosure, through one or more of its various aspects, embodiments, and/or specific features or sub-components, provides, inter alia, various systems, servers, devices, methods, media, programs, and platforms for providing an interactive user interface and data framework to facilitate automated analysis of historical data across regimes.

According to an aspect of the present disclosure, a method for facilitating automated analysis of historical data is disclosed. The method is implemented by at least one processor. The method may include generating at least one graphical user interface for a user, the at least one graphical user interface may include an interactive dashboard that is configured to receive input from the user; receiving, via the at least one graphical user interface, at least one query from the user, the at least one query may include at least one parameter and at least one date range; determining whether at least one report that corresponds to each of the at least one query is cached in a data repository; identifying, by using at least one model, at least one data set that corresponds to each of the at least one parameter and each of the at least one date range when the at least one report is not cached; generating, by using the at least one model, at least one new report based on the identified at least one data set, each of the at least one new report may correspond to the at least one query; and displaying, via the at least one graphical user interface, the at least one new report for the user.

In accordance with an exemplary embodiment, the method may further include retrieving the at least one report from the data repository when the at least one report is cached; and displaying, via the at least one graphical user interface, the at least one report for the user in response to the at least one query.

In accordance with an exemplary embodiment, each of the at least one report and each of the at least one new report may include historical information for at least one regime that corresponds to the at least one query.

In accordance with an exemplary embodiment, the historical information may include at least one historical date range for each of the at least one regime, at least one historical data set that corresponds to each of the at least one historical date range, and at least one statement that summarizes a correlation between each of the at least one regime and the at least one query.

In accordance with an exemplary embodiment, the method may further include determining, by using the at least one model, at least one predictive output for each of the at least one query based on at least one from among the at least one report and the at least one new report; and displaying, via the at least one graphical user interface, the at least one predictive output for the user.

In accordance with an exemplary embodiment, to generate the at least one graphical user interface, the method may further include retrieving at least one user profile that corresponds to the user, each of the at least one user profile may include authorization information for the user; determining at least one entitlement characteristic for the user based on the at least one user profile; and generating the at least one graphical user interface for the user based on the at least one entitlement characteristic, wherein the at least one entitlement characteristic may define a plurality of data access permissions and a plurality of data display permissions for the user.

In accordance with an exemplary embodiment, to generate the at least one new report, the method may further include retrieving at least one widget that corresponds to the at least one query; retrieving, via an application programming interface, raw data that correspond to the at least one query from at least one source; formatting the raw data based on a predetermined data requirement to generate at least one structured data set; and generating, by using the at least one model, the at least one new report based on the at least one widget and the at least one structed data set.

In accordance with an exemplary embodiment, the at least one widget may relate to a computing component that enables the user to perform at least one function that is associated with the at least one query.

In accordance with an exemplary embodiment, the at least one model may include at least one from among a large language model, a deep learning model, a neural network model, a natural language processing model, a machine learning model, a mathematical model, and a process model.

According to an aspect of the present disclosure, a computing device configured to implement an execution of a method for facilitating automated analysis of historical data is disclosed. The computing device including a processor; a memory; and a communication interface coupled to each of the processor and the memory, wherein the processor may be configured to generate at least one graphical user interface for a user, the at least one graphical user interface may include an interactive dashboard that is configured to receive input from the user; receive, via the at least one graphical user interface, at least one query from the user, the at least one query may include at least one parameter and at least one date range; determine whether at least one report that corresponds to each of the at least one query is cached in a data repository; identify, by using at least one model, at least one data set that corresponds to each of the at least one parameter and each of the at least one date range when the at least one report is not cached; generate, by using the at least one model, at least one new report based on the identified at least one data set, each of the at least one new report may correspond to the at least one query; and display, via the at least one graphical user interface, the at least one new report for the user.

In accordance with an exemplary embodiment, the processor may be further configured to retrieve the at least one report from the data repository when the at least one report is cached; and display, via the at least one graphical user interface, the at least one report for the user in response to the at least one query.

In accordance with an exemplary embodiment, each of the at least one report and each of the at least one new report may include historical information for at least one regime that corresponds to the at least one query.

In accordance with an exemplary embodiment, the historical information may include at least one historical date range for each of the at least one regime, at least one historical data set that corresponds to each of the at least one historical date range, and at least one statement that summarizes a correlation between each of the at least one regime and the at least one query.

In accordance with an exemplary embodiment, the processor may be further configured to determine, by using the at least one model, at least one predictive output for each of the at least one query based on at least one from among the at least one report and the at least one new report; and display, via the at least one graphical user interface, the at least one predictive output for the user.

In accordance with an exemplary embodiment, to generate the at least one graphical user interface, the processor may be further configured to retrieve at least one user profile that corresponds to the user, each of the at least one user profile may include authorization information for the user; determine at least one entitlement characteristic for the user based on the at least one user profile; and generate the at least one graphical user interface for the user based on the at least one entitlement characteristic, wherein the at least one entitlement characteristic may define a plurality of data access permissions and a plurality of data display permissions for the user.

In accordance with an exemplary embodiment, to generate the at least one new report, the processor may be further configured to retrieve at least one widget that corresponds to the at least one query; retrieve, via an application programming interface, raw data that correspond to the at least one query from at least one source; format the raw data based on a predetermined data requirement to generate at least one structured data set; and generate, by using the at least one model, the at least one new report based on the at least one widget and the at least one structed data set.

In accordance with an exemplary embodiment, the at least one widget may relate to a computing component that enables the user to perform at least one function that is associated with the at least one query.

In accordance with an exemplary embodiment, the at least one model may include at least one from among a large language model, a deep learning model, a neural network model, a natural language processing model, a machine learning model, a mathematical model, and a process model.

According to an aspect of the present disclosure, a non-transitory computer readable storage medium storing instructions for facilitating automated analysis of historical data is disclosed. The storage medium including executable code which, when executed by a processor, may cause the processor to generate at least one graphical user interface for a user, the at least one graphical user interface may include an interactive dashboard that is configured to receive input from the user; receive, via the at least one graphical user interface, at least one query from the user, the at least one query may include at least one parameter and at least one date range; determine whether at least one report that corresponds to each of the at least one query is cached in a data repository; identify, by using at least one model, at least one data set that corresponds to each of the at least one parameter and each of the at least one date range when the at least one report is not cached; generate, by using the at least one model, at least one new report based on the identified at least one data set, each of the at least one new report may correspond to the at least one query; and display, via the at least one graphical user interface, the at least one new report for the user.

In accordance with an exemplary embodiment, when executed by the processor, the executable code may further cause the processor to retrieve the at least one report from the data repository when the at least one report is cached; and display, via the at least one graphical user interface, the at least one report for the user in response to the at least one query.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
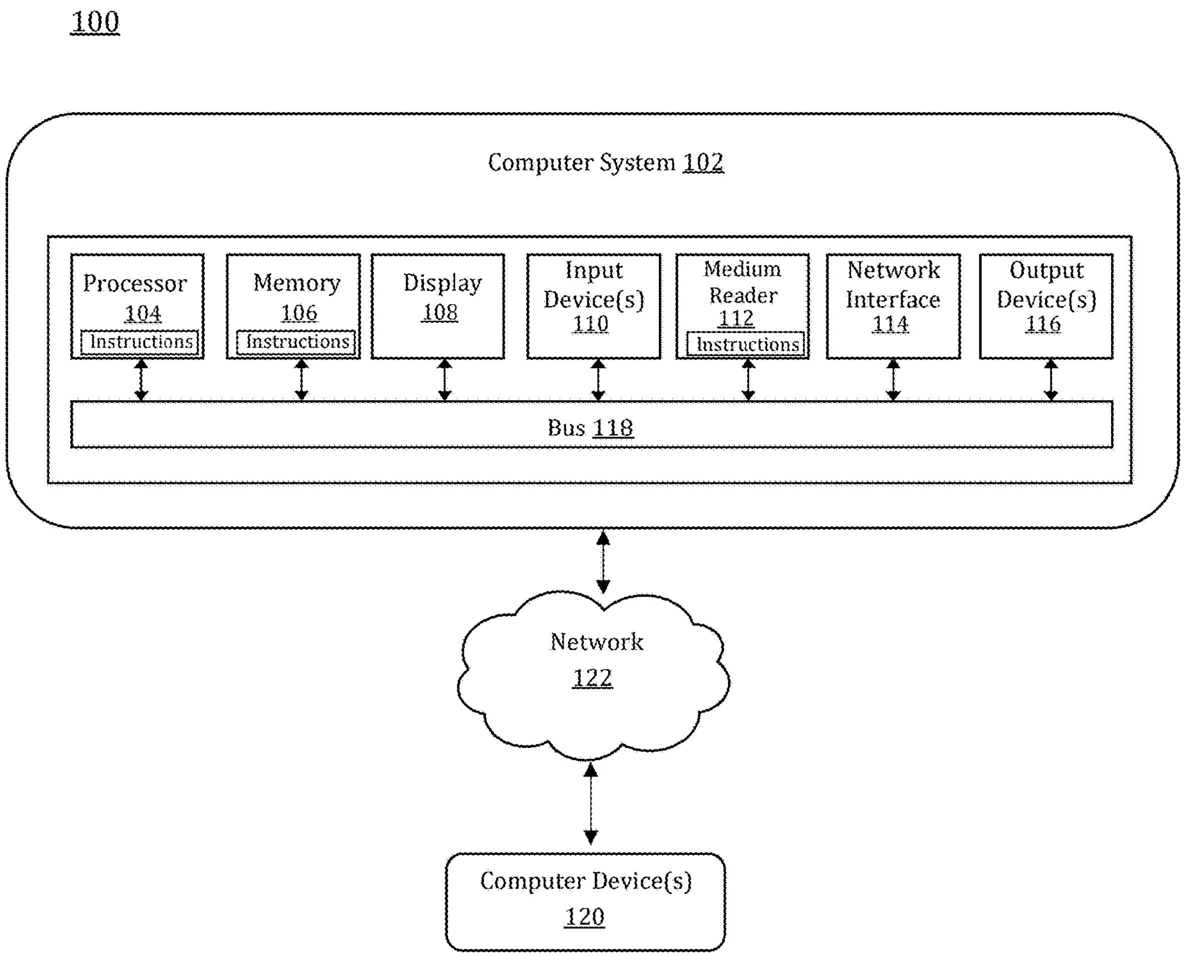
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an interactive user interface and data framework to facilitate automated analysis of historical data across regimes.

Figure 2:
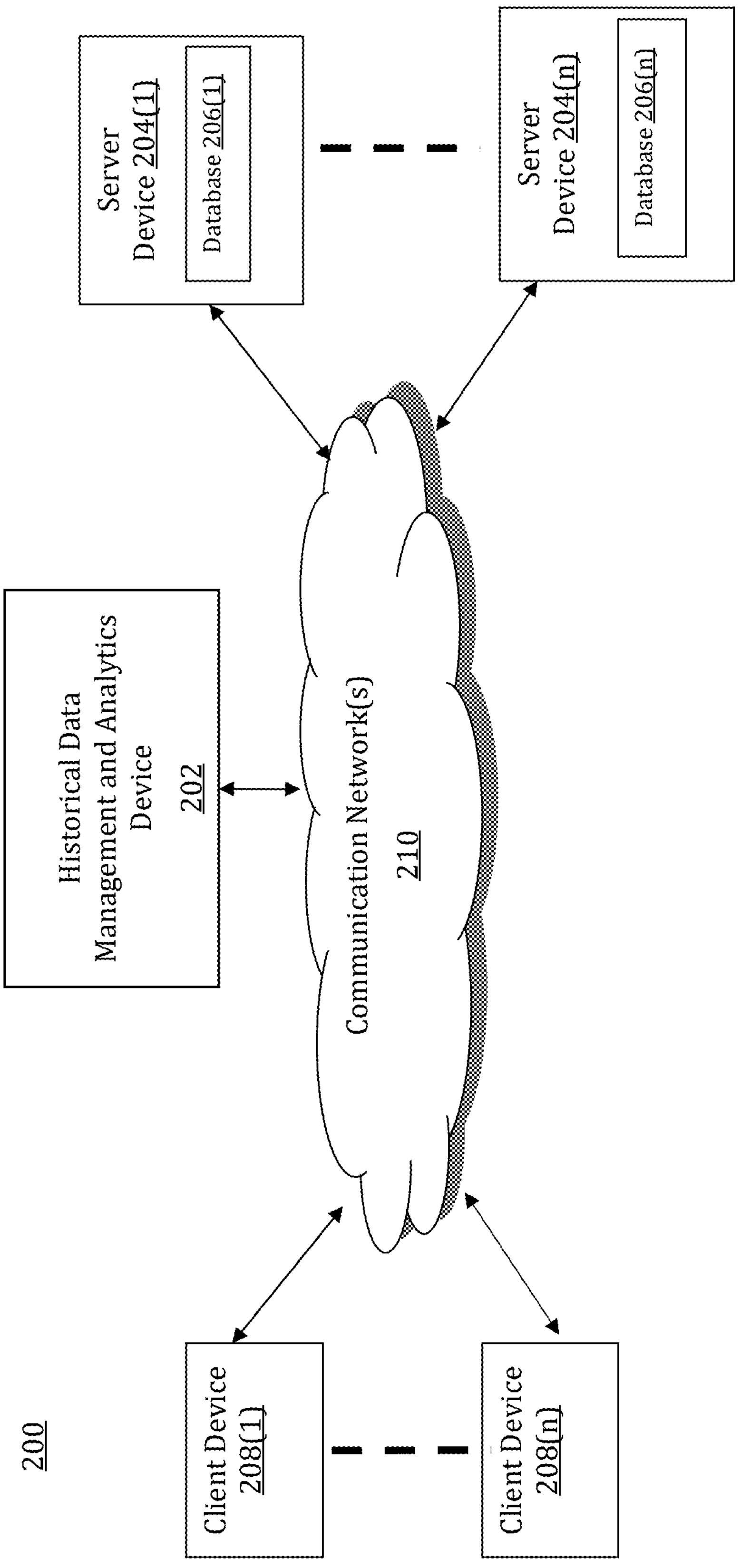
FIG. 2 illustrates an exemplary diagram of a network environment.

Referring to FIG. 2, a schematic of an exemplary network environment 200 for implementing a method for providing an interactive user interface and data framework to facilitate automated analysis of historical data across regimes is illustrated. In an exemplary embodiment, the method is executable on any networked computer platform, such as, for example, a personal computer (PC).

The method for providing an interactive user interface and data framework to facilitate automated analysis of historical data across regimes may be implemented by a Historical Data Management and Analytics (HDMA) device 202. The HDMA device 202 may be the same or similar to the computer system 102 as described with respect to FIG. 1. The HDMA device 202 may store one or more applications that can include executable instructions that, when executed by the HDMA device 202, cause the HDMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the HDMA device 202 itself, may be located in virtual server(s) running in a cloud-based computing environment rather than being tied to one or more specific physical network computing devices. Also, the application(s) may be running in one or more virtual machines (VMs) executing on the HDMA device 202. Additionally, in one or more embodiments of this technology, virtual machine(s) running on the HDMA device 202 may be managed or supervised by a hypervisor.

In the network environment 200 of FIG. 2, the HDMA device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the HDMA device 202, such as the network interface 114 of the computer system 102 of FIG. 1, operatively couples and communicates between the HDMA device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HDMA device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and HDMA devices that efficiently implement a method for providing an interactive user interface and data framework to facilitate automated analysis of historical data across regimes.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The HDMA device 202 may be a standalone device or integrated with one or more other devices or apparatuses, such as one or more of the server devices 204(1)-204(*n*), for example. In one particular example, the HDMA device 202 may include or be hosted by one of the server devices 204(1)-204(*n*), and other arrangements are also possible. Moreover, one or more of the devices of the HDMA device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the HDMA device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store data that relates to queries, parameters, date ranges, reports, and data sets.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the HDMA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the HDMA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the HDMA device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HDMA device 202, the server devices 204(1)-204(*n*), or the client devices 208(1)-208(*n*), for example, may be configured to operate as virtual instances on the same physical machine. In other words, one or more of the HDMA device 202, the server devices 204(1)-204(*n*), or the client devices 208(1)-208(*n*) may operate on the same physical device rather than as separate devices communicating through communication network(s) 210. Additionally, there may be more or fewer HDMA devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
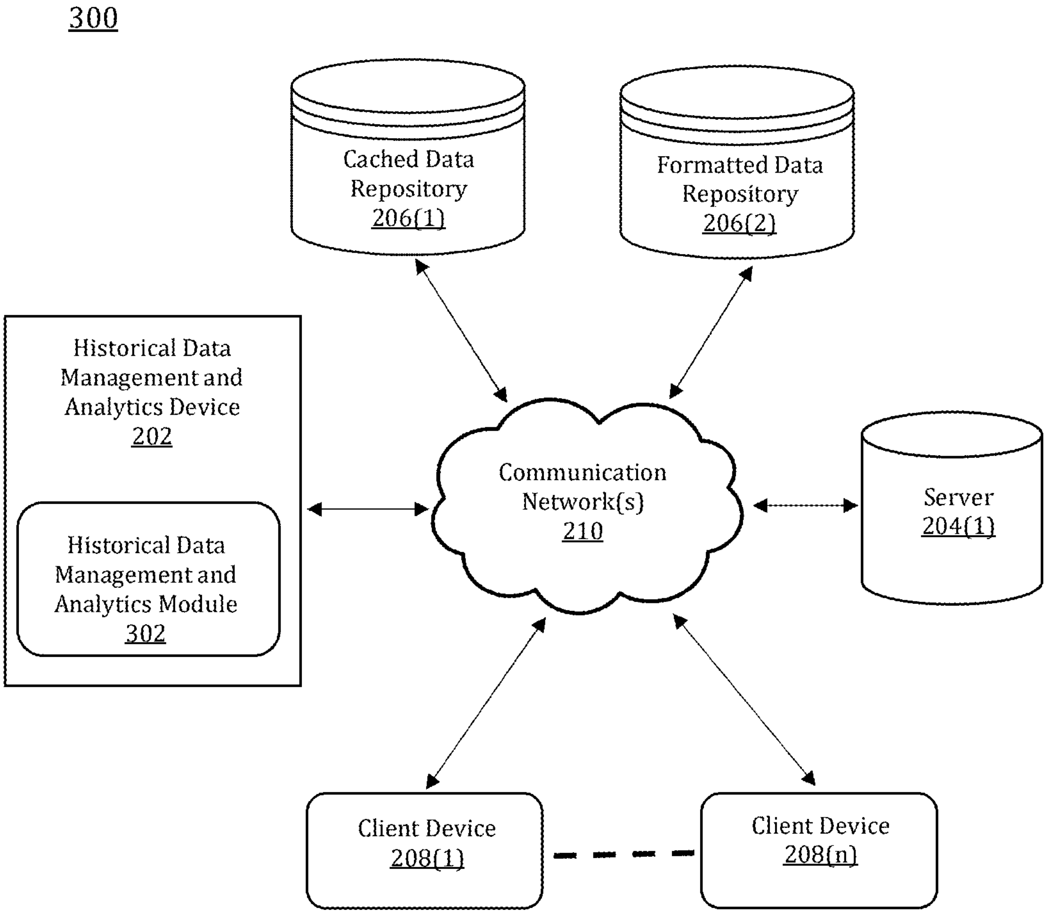
FIG. 3 shows an exemplary system for implementing a method for providing an interactive user interface and data framework to facilitate automated analysis of historical data across regimes.

The HDMA device 202 is described and shown in FIG. 3 as including a historical data management and analytics module 302, although it may include other rules, policies, modules, databases, or applications, for example. As will be described below, the historical data management and analytics module 302 is configured to implement a method for providing an interactive user interface and data framework to facilitate automated analysis of historical data across regimes.

An exemplary process 300 for implementing a mechanism for providing an interactive user interface and data framework to facilitate automated analysis of historical data across regimes by utilizing the network environment of FIG. 2 is shown as being executed in FIG. 3. Specifically, a first client device 208(1) and a second client device 208(2) are illustrated as being in communication with HDMA device 202. In this regard, the first client device 208(1) and the second client device 208(2) may be "clients" of the HDMA device 202 and are described herein as such. Nevertheless, it is to be known and understood that the first client device 208(1) and/or the second client device 208(2) need not necessarily be "clients" of the HDMA device 202, or any entity described in association therewith herein. Any additional or alternative relationship may exist between either or both of the first client device 208(1) and the second client device 208(2) and the HDMA device 202, or no relationship may exist.

Further, HDMA device 202 is illustrated as being able to access a cached data repository 206(1) and a formatted data repository 206(2). The historical data management and analytics module 302 may be configured to access these databases for implementing a method for providing an interactive user interface and data framework to facilitate automated analysis of historical data across regimes.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the HDMA device 202 via broadband or cellular communication. Of course, these embodiments are merely exemplary and are not limiting or exhaustive.

Upon being started, the historical data management and analytics module 302 executes a process for providing an interactive user interface and data framework to facilitate automated analysis of historical data across regimes. An exemplary process for providing an interactive user interface and data framework to facilitate automated analysis of historical data across regimes is generally indicated at flowchart 400 in FIG. 4.

Figure 4:
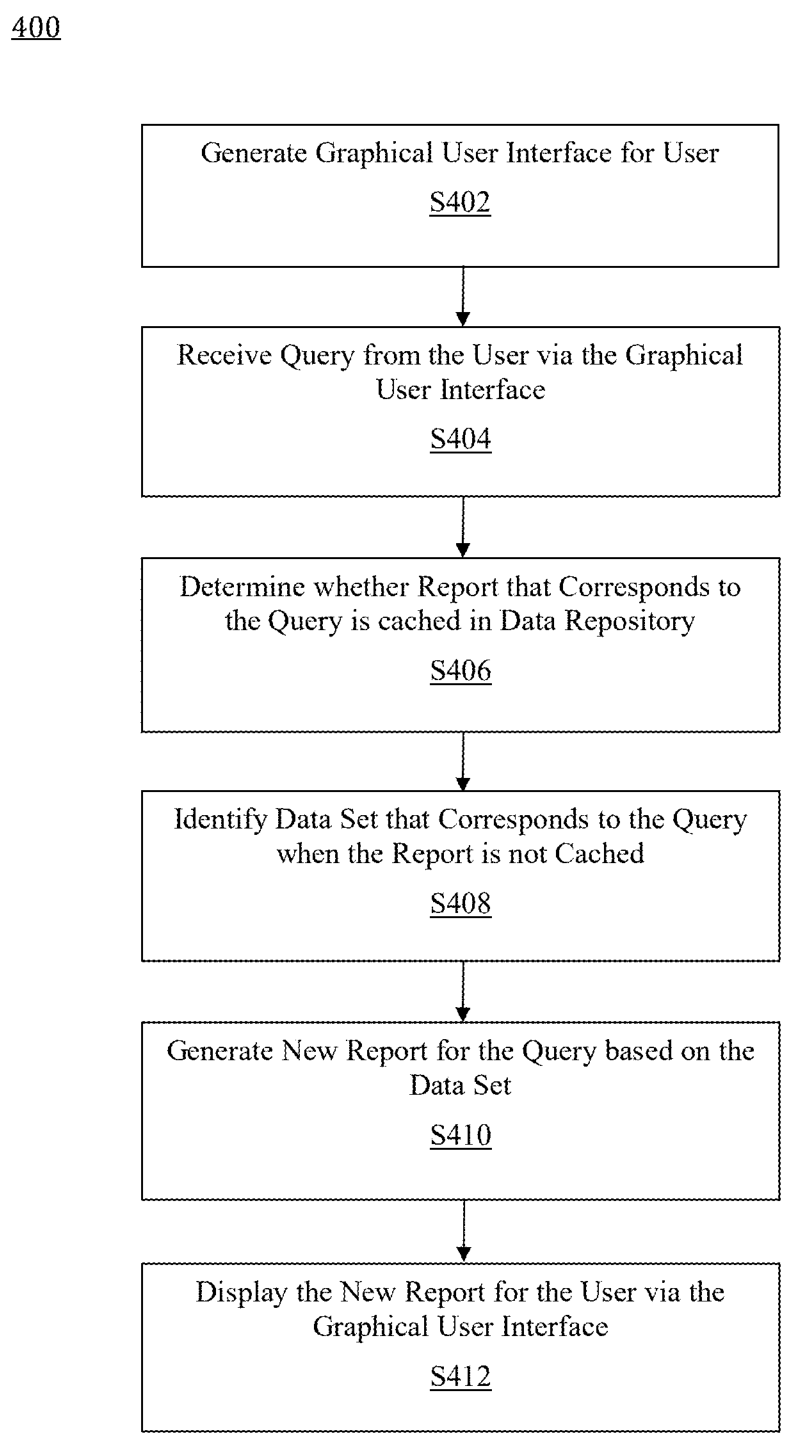
FIG. 4 is a flowchart of an exemplary process for implementing a method for providing an interactive user interface and data framework to facilitate automated analysis of historical data across regimes.

In the process 400 of FIG. 4, at step S402, a graphical user interface may be generated for a user. The graphical user interface may include an interactive dashboard that is configured to receive input from the user. In an exemplary embodiment, the graphical user interface may relate to a software program that enables a person to communicate with a computing system though the user of symbols, graphical icons, and visual indicators. The graphical user interface may provide a visual way of interacting with the computing system.

In another exemplary embodiment, the dashboard may correspond to a type of graphical user interface that provides quick views of data relevant to an objective and/or process. The dashboard may provide these views through a combination of visualizations and summary information. The dashboard may provide access to a unique data set that is designed to help assess similarities between current and historical regimes. That is, the dashboard may access a data framework that considers various parameters such as, for example, economic regimes and market prices by using a quantitative approach. Functions within the dashboard may be usable to facilitate analysis of future potential conditions.

In another exemplary embodiment, to facilitate the generating of the graphical user interface, user profiles that correspond to the user may be retrieved. Each of the user profiles may include authorization information for the user. The authorization information may relate to entitlements of the user within the disclosed system. The entitlements may include access permissions for various versions of the disclosed system such as, for example, an essential version that includes basic functionalities as well as a premium version that includes additional features and capabilities.

Then, entitlement characteristics may be determined for the user based on the user profiles. The entitlement characteristics may define a plurality of data access permissions and a plurality of data display permissions for the user. Finally, the graphical user interface may be generated for the user based on the entitlement characteristics. The graphical user interface may be generated to take into account what data may be accessed by the user and how that data may be displayed for the user. For example, the essential version of the graphical user interface may only display basic functionalities while the premium version of the graphical user interface may display additional features and data sets.

At step S404, queries may be received from the user via the generated graphical user interface. The queries may include parameters and date ranges. In an exemplary embodiment, the queries may request identification of historical dates that are comparable to the provided date ranges based on the included parameters. For example, the queries may include instructions for assessing similarities between a current economic regime and a historical economic regime. The queries may also request estimations of potential future returns for the provided date ranges based on actual returns measured from the identified historical dates.

In another exemplary embodiment, the queries may be received from a user device via the generated graphical user interface. The graphical user interface may be viewable on the user device via an application. The application may be associated with the disclosed system as a component of a software ecosystem.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S406, a determination may be made as to whether a report that corresponds to each of the queries is cached in a data repository. In an exemplary embodiment, the determination may enable identification of a previously generated report that matches parameters of the queries. Identification of previously generated reports may improve response times for user queries while saving system resources by preventing duplicate calculations and analysis.

In another exemplary embodiment, the report may include historical information for regimes that correspond to the queries. The historical information may include historical data ranges for each of the regimes, historical data sets that correspond to each of the historical date ranges, and statements that summarize a correlation between the regimes and the corresponding queries. The statements may include summaries in a natural language format that explains the determined correlation between the regimes and the corresponding queries.

At step S408, when the report is determined to not be cached in the data repository, data sets that correspond to each of the parameters and each of the date ranges may be identified by using a model. In an exemplary embodiment, the data sets may include information relating to each of the parameters for the corresponding date ranges. The information may include data for the individual parameters as well as a grouping of the parameters. Alternatively, when the report is determined to be cached in the data repository, the report may be retrieved from the data repository. Then, the report may be displayed for the user via the graphical user interface in response to the queries.

In another exemplary embodiment, the data sets may correspond to a data framework that has been segmented into a plurality of tiers. The data framework may use a combination of macroscopic data and market data to detect historical similarities. As such, the similarities may be detected not only in macroscopic terms but also from market perspectives such as, for example, market pricing perspectives.

In another exemplary embodiment, the plurality of tiers may include a first tier that corresponds to an overall macroscopic perspective. The overall macroscopic perspective may provide insight into the overall macroscopic environment for various parameters. For example, the overall macroscopic perspective may provide insight in terms of growth and inflation together with overall borrow conditions. The overall macroscopic perspective may characterize a general state of a system such as, for example, the economy.

In another exemplary embodiment, the plurality of tiers may include a second tier that corresponds to macroscopic changes. The macroscopic changes may relate to overall changes in a macroscopic environment. For example, the macroscopic changes may provide insight into how growth, inflation, and borrow conditions have changes over a period of time. The macroscopic changes may be usable to identify a direction and/or trend of the system.

In another exemplary embodiment, the plurality of tiers may include a third tier that corresponds to a valuation perspective. The valuation perspective may provide insight into reactions of the system to changes. For example, the valuation perspective may provide market pricing reactions in terms of equities, exchanges, and interest rates based on various changes to the system. The valuation perspective may be usable to establish valuations for the system as well as components of the system.

In another exemplary embodiment, the tiers may be analyzed sequentially, where comparable historical time periods in terms of the overall macroscopic perspective is determined first. Then, given the similarities in the overall macroscopic perspective, similar periods in terms of macroscopic changes may be identified. Finally, historical dates that are comparable in terms of the valuation perspective may be discovered, being close from both an overall macroscopic perspective and a macroscopic changes perspective. Upon finding these comparable historical dates, consideration may be taken so that the observed dates are sufficiently separated from each other, amongst other constraints.

In another exemplary embodiment, the model may include at least one from among a large language model, a deep learning model, a neural network model, a natural language processing model, a machine learning model, a mathematical model, and a process model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori Algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the large language model may relate to a trained deep-learning model that understands and generates text in a human-like fashion. The large language model may recognize, summarize, translate, predict, and generate various types of text as well as content based on knowledge gained from massive data sets. In another exemplary embodiment, the large language model may correspond to a language model that consists of a neural network with many parameters such as, for example, weights. The language model may be trained on large quantities of unlabeled and labeled text by using self-supervised learning or semi-supervised learning. The trained language model may be usable to capture syntax and semantics of human language.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S410, a new report may be generated by using the model based on the identified data sets. The new report may correspond to the received queries. In an exemplary embodiment, consistent with present disclosures, the new report may include historical information for regimes that correspond to the queries. The historical information may include historical data ranges for each of the regimes, historical data sets that correspond to each of the historical date ranges, and statements that summarize a correlation between the regimes and the corresponding queries. The statements may include summaries in a natural language format that explains the determined correlation between the regimes and the corresponding queries.

In another exemplary embodiment, to facilitate the generating of the new report, widgets that correspond to the queries may be retrieved. The widgets may relate to computing components that enable the user to perform functions that are associated with the queries. Likewise, raw data that correspond to the queries may also be retrieved from various sources via an application programming interface. The raw data may be automatically formatted based on a predetermined data requirement to generate structured data sets. Then, the new report may be generated based on the widgets and the structured data sets by using the model.

At step S412, the new report is displayed for the user via the graphical user interface. Consistent with present disclosures, the new report may be displayed via an interactive data dashboard that is designed for assessing similarities between a current regime and a historical regime. The new report may be displayed together with an analysis of future potential conditions that correspond to the current regime.

In another exemplary embodiment, unique data sets within the report and the new report may be designed to facilitate similarity assessments between current and historical regimes. The similarity assessments may further facilitate analysis of future potential conditions. To facilitate analysis of future potential conditions, predictive outputs for each of the queries may be determined based on at least one from among the report and the new report. The predictive outputs may be determined by using the model. Then, the predictive outputs may be displayed for the user via the graphical user interface.

Figure 5:
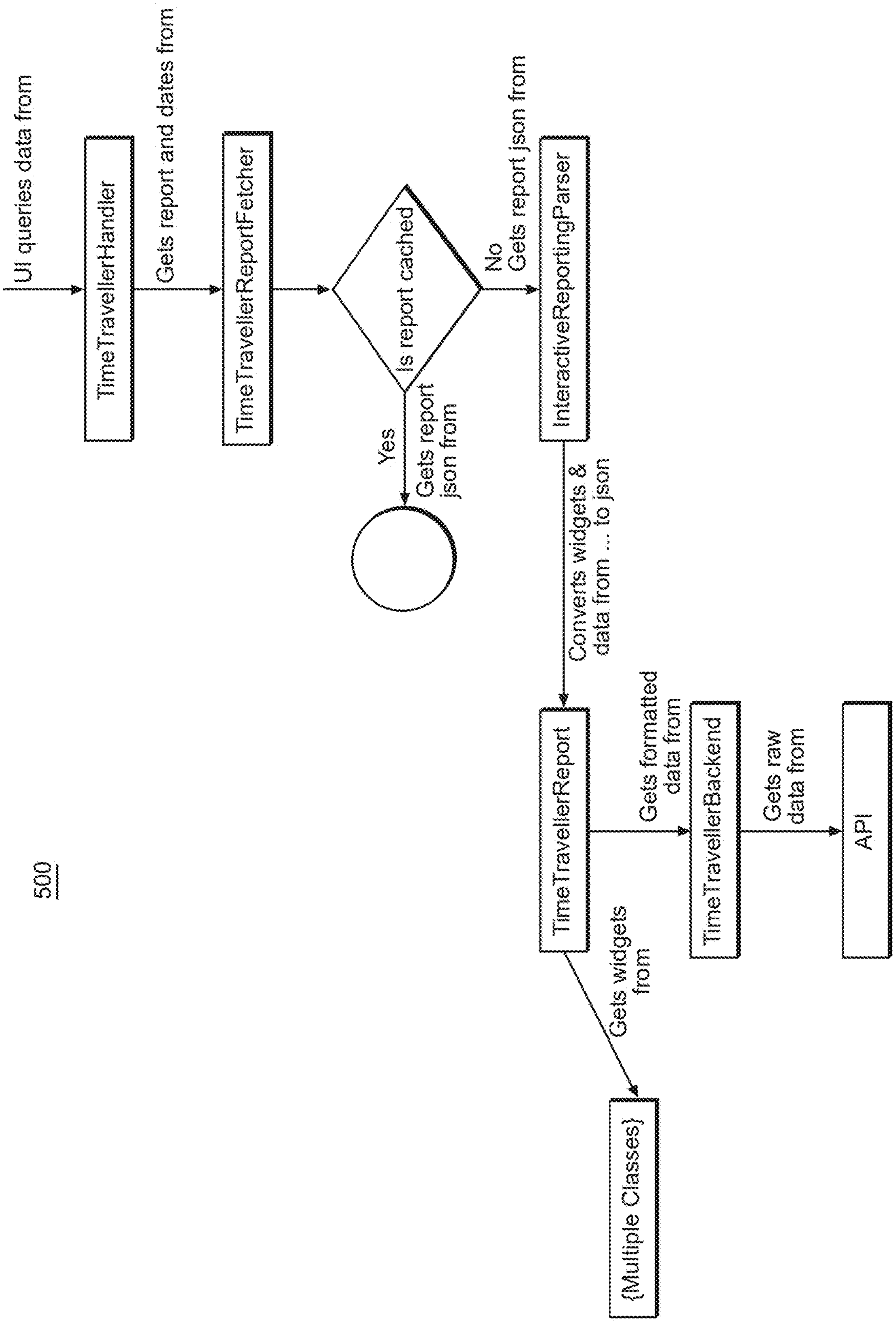
FIG. 5 is a flow diagram of an exemplary process for implementing a method for providing an interactive user interface and data framework to facilitate automated analysis of historical data across regimes.

FIG. 5 is a flow diagram 500 of an exemplary process for implementing a method for providing an interactive user interface and data framework to facilitate automated analysis of historical data across regimes. In FIG. 5, an interactive dashboard provides access to a unique data framework that is designed to facilitate similarity assessments between a current regime and a historical regime. Furthermore, the interactive dashboard, together with the unique data framework, may facilitate analysis of future potential conditions.

As illustrated in FIG. 5, the graphical user interface may query data from a data handler based on inputs from a user. The data handler may interact with a report fetcher component to get a report of compatible date ranges. The report fetcher component may access a data repository to determine whether the report is cached in a compatible data format. When the report is determined to be cached, the report fetcher retrieves the report for a response to the query.

Alternatively, when the report is determined to not be cached, a reporting parser may be initialized to get a report from a report generation component. The reporting parser may convert relevant reporting data into the compatible data format for caching in the data repository as well as for responding to the query. The report generation component may identify and retrieve widgets that corresponds to the query. The report generation component may interact with a backend component to retrieve additional formatted data. The backend component may provide the additional formatted data by using an application programming interface to retrieve corresponding raw data from various sources such as, for example, from first-party sources as well as from third-party sources.

Accordingly, with this technology, an optimized process for providing an interactive user interface and data framework to facilitate automated analysis of historical data across regimes is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated analysis of historical data, the method being implemented by at least one processor, the method comprising:

generating, by the at least one processor, at least one graphical user interface for a user, the at least one graphical user interface including an interactive dashboard that is configured to receive input from the user;

receiving, by the at least one processor via the at least one graphical user interface, at least one query from the user, the at least one query including at least one parameter and at least one date range;

determining, by the at least one processor, whether at least one report that corresponds to each of the at least one query is cached in a data repository;

when the at least one report is determined as being cached in the data repository, retrieving the at least one report from the data repository; and when the at least one report is determined as not being cached in the data repository:

identifying, by the at least one processor using at least one model, at least one data set that corresponds to each of the at least one parameter and each of the at least one date range;

generating, by the at least one processor using the at least one model, at least one new report based on the identified at least one data set, each of the at least one new report corresponding to the at least one query; and displaying, by the at least one processor via the at least one graphical user interface, the at least one new report for the user, wherein the at least one new report includes, for each respective regime from among a current economic regime and at least one historical economic regime that respectively correspond to a respective query from among the at least one query, a respective data set that respectively corresponds to each respective regime and the respective query and a respective summary that explains a correlation between each respective regime and the respective query, the respective summary being provided in a natural language format.

2. The method of claim 1, further comprising:

retrieving, by the at least one processor, the at least one report from the data repository when the at least one report is cached; and displaying, by the at least one processor via the at least one graphical user interface, the at least one report for the user in response to the at least one query.

3. The method of claim 2, wherein each of the at least one report and each of the at least one new report includes historical information for each respective regime that corresponds to the respective query from among the at least one query.

4. The method of claim 3, wherein the at least one data set corresponds to a data framework that is segmented into a plurality of tiers, the plurality of tiers including a first tier that corresponds to an overall macroscopic perspective that provides insight in terms of growth and inflation together with borrow conditions, a second tier that corresponds to macroscopic changes that provide insight into how the growth, the inflation, and the borrow conditions have changed over a period of time, and a third tier that corresponds to a valuation perspective that provides market pricing reactions in terms of equities, exchanges, and interest rates.

5. The method of claim 1, further comprising:

determining, by the at least one processor using the at least one model, at least one predictive output for each of the at least one query based on at least one from among the at least one report and the at least one new report; and displaying, by the at least one processor via the at least one graphical user interface, the at least one predictive output for the user.

6. The method of claim 1, wherein the generating of the at least one graphical user interface further comprises:

retrieving, by the at least one processor, at least one user profile that corresponds to the user, each of the at least one user profile including authorization information for the user;

determining, by the at least one processor, at least one entitlement characteristic for the user based on the at least one user profile; and generating, by the at least one processor, the at least one graphical user interface for the user based on the at least one entitlement characteristic, wherein the at least one entitlement characteristic defines a plurality of data access permissions and a plurality of data display permissions for the user.

7. The method of claim 1, wherein the generating of the at least one new report further comprises:

retrieving, by the at least one processor, at least one widget that corresponds to the at least one query;

retrieving, by the at least one processor via an application programming interface, raw data that correspond to the at least one query from at least one source;

formatting, by the at least one processor, the raw data based on a predetermined data requirement to generate at least one structured data set; and generating, by the at least one processor using the at least one model, the at least one new report based on the at least one widget and the at least one structed data set.

8. The method of claim 7, wherein the at least one widget relates to a computing component that enables the user to perform at least one function that is associated with the at least one query.

9. The method of claim 1, wherein the at least one model includes at least one from among a large language model, a deep learning model, a neural network model, a natural language processing model, and a mathematical model.

10. A computing device configured to implement an execution of a method for facilitating automated analysis of historical data, the computing device comprising:

a processor;

a memory; and a communication interface coupled to each of the processor and the memory, wherein the processor is configured to:

generate at least one graphical user interface for a user, the at least one graphical user interface including an interactive dashboard that is configured to receive input from the user;

receive, via the at least one graphical user interface, at least one query from the user, the at least one query including at least one parameter and at least one date range;

determine whether at least one report that corresponds to each of the at least one query is cached in a data repository;

when the at least one report is determined as being cached in the data repository. retrieve the at least one report from the data repository; and when the at least one report is determined as not being cached in the data repository:

identify, by using at least one model, at least one data set that corresponds to each of the at least one parameter and each of the at least one date range;

generate, by using the at least one model, at least one new report based on the identified at least one data set, each of the at least one new report corresponding to the at least one query; and display, via the at least one graphical user interface, the at least one new report for the user, wherein the at least one new report includes, for each respective regime from among a current economic regime and at least one historical economic regime that respectively correspond to a respective query from among the at least one query, a respective data set that respectively corresponds to each respective regime and the respective query and a respective summary that explains a correlation between each respective regime and the respective query, the respective summary being provided in a natural language format.

11. The computing device of claim 10, wherein the processor is further configured to:

retrieve the at least one report from the data repository when the at least one report is cached; and display, via the at least one graphical user interface, the at least one report for the user in response to the at least one query.

12. The computing device of claim 11, wherein each of the at least one report and each of the at least one new report includes historical information for each respective regime that corresponds to the respective query from among the at least one query.

13. The computing device of claim 12, wherein the at least one data set corresponds to a data framework that is segmented into a plurality of tiers, the plurality of tiers including a first tier that corresponds to an overall macroscopic perspective that provides insight in terms of growth and inflation together with borrow conditions, a second tier that corresponds to macroscopic changes that provide insight into how the growth, the inflation, and the borrow conditions have changed over a period of time, and a third tier that corresponds to a valuation perspective that provides market pricing reactions in terms of equities, exchanges, and interest rates.

14. The computing device of claim 10, wherein the processor is further configured to:

determine, by using the at least one model, at least one predictive output for each of the at least one query based on at least one from among the at least one report and the at least one new report; and display, via the at least one graphical user interface, the at least one predictive output for the user.

15. The computing device of claim 10, wherein, to generate the at least one graphical user interface, the processor is further configured to:

retrieve at least one user profile that corresponds to the user, each of the at least one user profile including authorization information for the user;

determine at least one entitlement characteristic for the user based on the at least one user profile; and generate the at least one graphical user interface for the user based on the at least one entitlement characteristic, wherein the at least one entitlement characteristic defines a plurality of data access permissions and a plurality of data display permissions for the user.

16. The computing device of claim 10, wherein, to generate the at least one new report, the processor is further configured to:

retrieve at least one widget that corresponds to the at least one query;

retrieve, via an application programming interface, raw data that correspond to the at least one query from at least one source;

format the raw data based on a predetermined data requirement to generate at least one structured data set; and generate, by using the at least one model, the at least one new report based on the at least one widget and the at least one structed data set.

17. The computing device of claim 16, wherein the at least one widget relates to a computing component that enables the user to perform at least one function that is associated with the at least one query.

18. The computing device of claim 10, wherein the at least one model includes at least one from among a large language model, a deep learning model, a neural network model, a natural language processing model, and a mathematical model.

19. A non-transitory computer readable storage medium storing instructions for facilitating automated analysis of historical data, the storage medium comprising executable code which, when executed by a processor, causes the processor to:

generate at least one graphical user interface for a user, the at least one graphical user interface including an interactive dashboard that is configured to receive input from the user;

receive, via the at least one graphical user interface, at least one query from the user, the at least one query including at least one parameter and at least one date range;

determine whether at least one report that corresponds to each of the at least one query is cached in a data repository;

when the at least one report is determined as being cached in the data repository, retrieve the at least one report from the data repository; and when the at least one report is determined as not being cached in the data repository:

identify, by using at least one model, at least one data set that corresponds to each of the at least one parameter and each of the at least one date range;

generate, by using the at least one model, at least one new report based on the identified at least one data set, each of the at least one new report corresponding to the at least one query; and display, via the at least one graphical user interface, the at least one new report for the user, wherein the at least one new report includes, for each respective regime from among a current economic regime and at least one historical economic regime that respectively correspond to a respective query from among the at least one query, a respective data set that respectively corresponds to each respective regime and the respective query and a respective summary that explains a correlation between each respective regime and the respective query, the respective summary being provided in a natural language format.

20. The storage medium of claim 19, wherein, when executed by the processor, the executable code further causes the processor to:

retrieve the at least one report from the data repository when the at least one report is cached; and display, via the at least one graphical user interface, the at least one report for the user in response to the at least one query.

* * * * *